United States Patent [19]

De Doncker

[11] Patent Number: 5,144,216
[45] Date of Patent: Sep. 1, 1992

[54] HIGH SPEED FLUX FEEDBACK FOR TUNING A UNIVERSAL FIELD ORIENTED CONTROLLER CAPABLE OF OPERATING IN DIRECT AND INDIRECT FIELD ORIENTATION MODES

[75] Inventor: Rik W. A. A. De Doncker, Schenectady, N.Y.

[73] Assignee: General Electric Company, Schenectady, N.Y.

[21] Appl. No.: 769,692

[22] Filed: Oct. 2, 1991

[51] Int. Cl.$^5$ ............................................. H02P 5/40
[52] U.S. Cl. ..................................... 318/807; 318/800
[58] Field of Search ......... 318/800, 803, 805, 807–811

[56] References Cited

U.S. PATENT DOCUMENTS

| | | |
|---|---|---|
| 4,028,600 | 6/1977 | Blaschke et al. |
| 4,724,373 | 2/1988 | Lipo ..................................... 318/805 |
| 4,885,520 | 12/1989 | Sugimoto et al. ..................... 318/805 |
| 4,968,925 | 11/1990 | De Doncker . |

OTHER PUBLICATIONS

De Doncker, Rik, "Synthesis and Digital Implementation of Adaptive Field Oriented Controllers for Induction Machines with Airgap Flux Control and Deep Bar Compensation", Ph.D. thesis, Katholieke Universiteit Leuven, Dec. 1986, pp. 164–166.

*Primary Examiner*—David Smith, Jr.
*Attorney, Agent, or Firm*—Jill M. Breedloe; James C. Davis, Jr.; Marvin Snyder

[57] ABSTRACT

The direct (d) and quadrature (q) components of flux, as sensed by flux sensors or determined from voltage and current measurements in a direct field orientation scheme, are processed rapidly and accurately to provide flux amplitude and angular position values for use by the vector rotator of a universal field-oriented (UFO) controller. Flux amplitude (linear or squared) is provided as feedback to tune the UFO controller for operation in direct and indirect field orientation modes and enables smooth transitions from one mode to the other.

33 Claims, 2 Drawing Sheets

HIGH SPEED FLUX FEEDBACK FOR TUNING A UNIVERSAL FIELD ORIENTED CONTROLLER CAPABLE OF OPERATING IN DIRECT AND INDIRECT FIELD ORIENTATION MODES

The Government of the United States of America has rights in this invention pursuant to Contract No. DEA-CO79OID13019 awarded by the U.S. Department of Energy.

RELATED APPLICATIONS

This application is related to commonly assigned U.S. patent application Ser. No. 07/769,694 of R.W.A.A. De Doncker et al., filed concurrently herewith and incorporated by reference herein.

FIELD OF THE INVENTION

The present invention relates generally to field-oriented controllers. More particularly, the present invention relates to high speed flux angle and position feedback for a universal field-oriented controller for an induction machine.

BACKGROUND OF THE INVENTION

In commonly assigned U.S. Pat. No. 4,968,925 of Rik W.A.A. De Doncker, issued Nov. 6, 1990, a universal field-oriented (UFO) controller is described which allows for field-oriented control of induction machines in an arbitrary flux reference frame. The principle of the UFO controller applies to both direct and indirect field orientation. In practice, this allows for the integration of six different field orientation schemes into a single control, i.e., direct and indirect field orientation in rotor flux, air gap flux and stator flux reference frames. In operation of the UFO controller, a synchronous reference frame is selected by setting the effective stator-to-rotor turns ratio to a predetermined value corresponding thereto. Transitions between reference frames are accomplished by changing the turns ratio. The result is complete decoupling of torque and flux in a flexible, simple and robust drive that is relatively insensitive to machine parameters. U.S. Pat. No. 4,968,925 is incorporated by reference herein.

A problem in direct field orientation is that sensed direct (d) and quadrature (q) components of flux must be processed to an angle to be useful for the vector rotator of the field oriented controller which transforms the coordinates of a vector from one reference frame to another. This involves a Cartesian-to-polar (C/P) coordinate transformation that requires many processor instruction cycles. In particular, the dq coordinates of a flux space vector $\Psi$ are represented as $\Psi_d$ and $\Psi_q$, and the C/P transformation formulas are:

$$\Psi + \sqrt{\Psi_d^2 + \Psi_q^2} \text{ ; and}$$

$$\gamma = \arctan \frac{\Psi_q}{\Psi_d},$$

where $\Psi$ is the amplitude and $\delta$ is the angle of the flux space vector.

Conventionally, the square root function and the arc tangent function in C/P transformations are performed with either look-up tables or by iterative approximations. Alternatively, the square root function may be processed using a sequential square root algorithm. Disadvantageously, such functions take too much time for high speed drives.

Therefore, it is desirable to provide a method for quickly and accurately determining the amplitude and angle components of flux for use in a field-oriented control scheme.

SUMMARY OF THE INVENTION

The direct (d) and quadrature (q) components of flux, as sensed by flux sensors or determined from voltage and current measurements in a direct field orientation scheme, are processed rapidly and accurately to provide flux amplitude and angular position values for use by the vector rotator of a field-oriented controller. According to a first method of the present invention, flux amplitude is determined by feeding back the square of the amplitude of the sensed flux for comparison with the square of a flux command. The open loop gain K* of the feedback loop is used to adjust the flux amplitude $\Psi$ and/or the flux component of the stator current $i_{sd}{}^a$. The flux angle $\Psi$ is determined by integrating the actual frequency $\omega$ of the flux space vector which is digitally approximated by:

$$\omega_n = \frac{1}{T} \frac{1}{\Psi_n^2} (\Psi_{d(n-1)}\Psi_{qn} - \Psi_{q(n-1)}\Psi_{dn}).$$

where T represents the sampling interval, thus avoiding the arc tangent function. Advantageously, the term $\Psi_n^2$ is already available from feedback of the square of the sensed flux to determine the flux amplitude, as described hereinabove. An exemplary method of integrating the frequency $\omega$ to determine the flux angle $\gamma$ involves the expression:

$$\gamma_n = \gamma_{n-1} + T\omega_n.$$

Since quantization noise, signal noise and offsets may disturb the angle integration process of the first method described hereinabove, a second method adds an angle correction term and involves calculation of the dq components of flux in an arbitrary UFO flux reference frame from the sensed dq components of flux according to:

$$\Psi_d{}^a = \Psi_d{}^s\cos\gamma = \Psi_q{}^s\sin\gamma; \text{ and}$$

$$\Psi_q{}^a = \Psi_q{}^s\cos\gamma - \Psi_d{}^s\sin\gamma$$

Advantageously, the sine and cosine functions are already available from the vector rotator of the UFO controller. According to this second method, the calculated q component of flux $\Psi_q{}^a$ is used to close a flux angle feedback loop to compensate for errors due to noise and offsets. Moreover, by this second method, the calculated d component of flux $\Psi_d{}^a$ is equal to the flux amplitude $\Psi$ which may be used for linear flux feedback.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
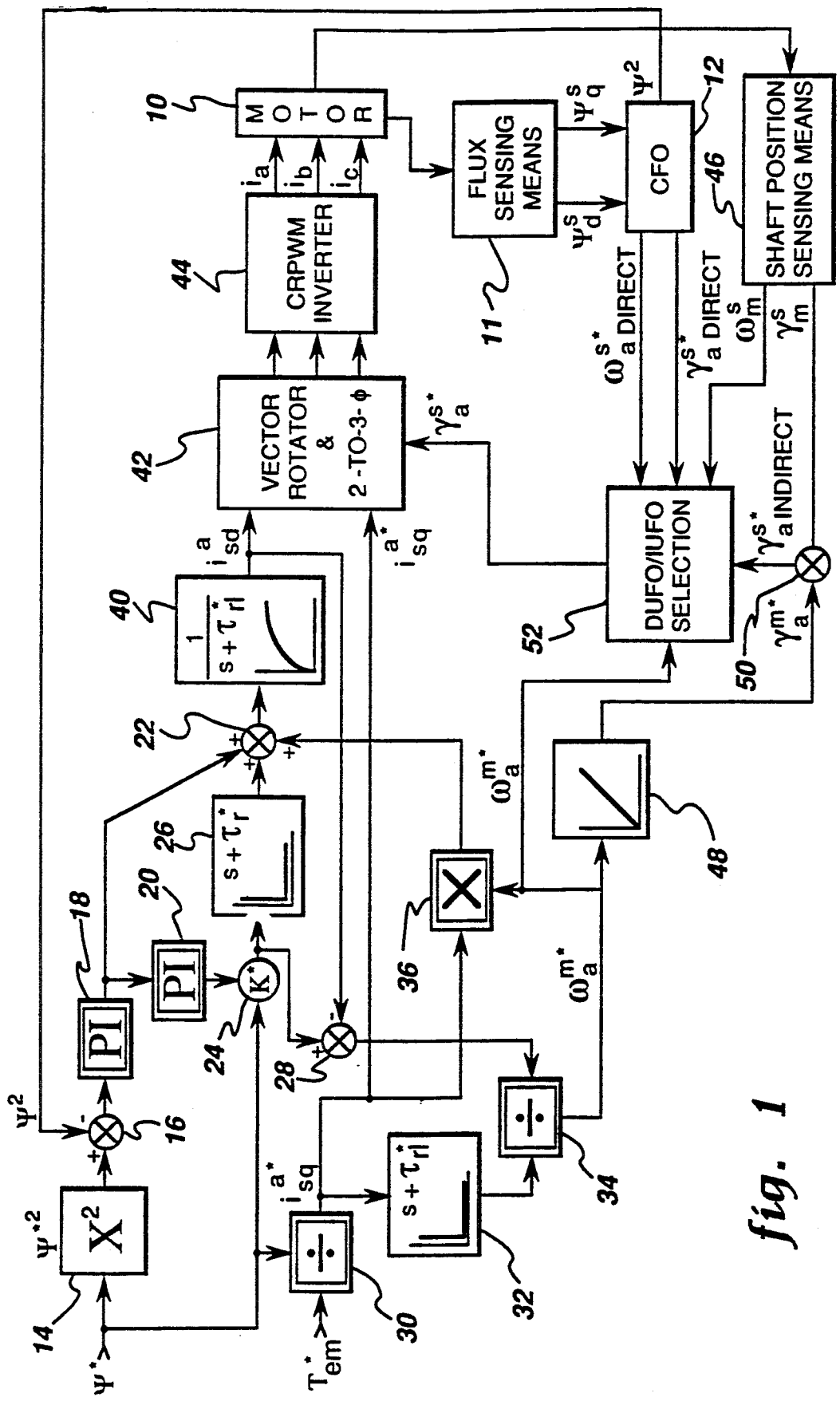
FIG. 1 is a block diagram illustrating a UFO controller capable of operation in indirect and direct field orientation modes, which UFO controller employs flux feedback in the direct made according to the present invention.

FIG. 1 illustrates a UFO controller of the type described in De Doncker U.S. Pat. No. 4,968,925, cited hereinabove, with the addition of high speed flux feedback in accordance with the present invention. As described in U.S. Pat. No. 4,968,925, the induction machine equations expressed in an arbitrary synchronous reference frame i linked to an arbitrary flux vector are as follows:

$$\underline{v}_s^i = R_s \underline{i}_s^i + \frac{d\underline{\Psi}_s^i}{dt} + j\frac{d\gamma_i^s}{dt}\underline{\Psi}_s^i \quad (1)$$

$$0 = R_r \underline{i}_r^i + \frac{d\underline{\Psi}_r^i}{dt} + j\frac{d\gamma_i^m}{dt}\underline{\Psi}_r^i \quad (2)$$

$$\underline{\Psi}_s^i = L_s \underline{i}_s^i + L_{sl} \underline{i}_r^i = L_s \underline{i}_s^i + \underline{\Psi}_h^i \quad (3)$$
$$\underline{\Psi}_r^i = L_h \underline{i}_s^i + L_r \underline{i}_r^i = L_r \underline{i}_r^i + \underline{\Psi}_h^i \quad (4)$$

$$T_{em} = \frac{3}{2} p \, Im(\underline{i}_s^i \cdot \underline{\Psi}_s^{i*}) \quad (5)$$

$$J \frac{d^2\gamma_m^s}{dt^2} = T_{em} - T_{load} \quad (6)$$

$$\gamma_m^s + \gamma_i^m = \gamma_i^s \quad (7)$$

with:
$L_s = L_h + L_{sl}$
$L_r = L_h + L_{rl}$
where:
$v_s^i$ = instantaneous stator voltage
$R_s$ = stator resistance
$R_r$ = rotor resistance
$L_h$ = main inductance
$L_{sl}$ = stator leakage inductance
$L_{rl}$ = rotor leakage inductance
$L_s$ = stator inductance
$L_r$ = rotor inductance
$T_{em}$ = electromagnetic torque
$p$ = pole pair number
$T_{load}$ = load torque
$J$ = system inertia
$\gamma_m^s$ = angular position of rotor shaft with respect to a fixed stator reference frame
$\gamma_i^s$ = angle from a fixed stator reference to arbitrary reference frame $i$
$\gamma_i^m$ = angle from the rotor shaft to arbitrary reference frame $i$;

and the system variables, including flux linkage $\Psi$ and current $i$, are written according to the following convention:

$$\underline{x}_j^i = x_{jd}^i + jx_{jq}^i = x_{jd}^i + \sqrt{-1}\,x_{jq}^i$$

with:
$j = r$: rotor quantities
$j = s$: stator quantities
$j = h$: air gap quantities
$j = m$: mechanical rotor quantity (position)
$i = r$: rotor flux synchronous reference frame
$i = s$: stationary reference frame linked to phase a of the stator windings
$i = t$: stator flux synchronous reference frame
$i = h$: air gap flux reference frame
$i = m$: rotating reference frame linked to the rotor shaft
$i = i$: arbitrary synchronous reference frame $i = a$: synchronous reference frame linked to arbitrary flux vector.

According to U.S. Pat. No. 4,968,925, the arbitrary reference frame i is linked to an arbitrary flux vector which can be derived from flux linkage equations (3) and (4) above by means of a stator-to-rotor effective turns ratio (a) transformation.

The present invention provides high-speed flux feedback in a UFO controller in order to avoid detuned operation of an induction motor drive such that operation at the commanded flux and corresponding slip frequency are achieved. As shown in FIG. 1, for operation of the UFO controller in a direct field orientation (DUFO) mode, flux measurements are taken from the respective stator phases of a motor 10 by a flux sensing means 11 and are provided to a calculator for field orientation (CFO) 12. CFO 12 quickly and accurately determines the amplitude and angle components of flux from the flux measurements and provides flux amplitude squared feedback $\Psi^2$ in accordance with the present invention.

Flux sensing means 11 may comprise Hall effect sensors or flux coils to measure flux directly. Alternatively, flux sensing means 11 may calculate flux from measurements of stator voltages and currents in a well-known manner according to:

$$\Psi = \int (V_s - I_s R_s)\, dt,$$

where $R_s$ is the resistance of the respective stator phase winding, $V_s$ is the stator voltage, and $I_s$ is the respective stator phase current.

As shown in FIG. 1, a flux command $\Psi^*_s$ is squared in a multiplier 14 and then compared by a summer 16 with the flux amplitude squared feedback $\Psi^2$ from CFO 12. The resultant error signal is applied to a proportional-integral (PI) compensator 18, the output signal of which is applied to another PI compensator 20 and, via an alternate path, to a summer 22. The output of PI compensator 20 is added to the open loop gain K* of a multiplier 24. In particular, PI compensator 20 is set to provide a slow gain change to adapt K* to tune the UFO controller. An expression for the open loop gain is given as follows:

$$K^* = \frac{1}{a^* L_h^* \sigma_a^*},$$

where $$\sigma = \frac{a^* L_r^* - L_h^*}{a^* L_r^*},$$

The resulting signal $K^* \Psi^*_s$ is applied to a circuit 26 having the transfer function $$s + \tau_r^*,$$

where $$\tau_r^* = \frac{R_r^*}{L_r^*} = \frac{1}{T_r^*}.$$

The signal $K^*\Psi^*_s$ is also applied, via an alternate path, to a summer 28 wherein it is combined with the direct component of stator current $i_{sd}^a$ according to the UFO decoupling equations set forth in De Doncker U.S. Pat. No. 4,968,925, cited hereinabove. A stator current command $i_{sq}{}^{a*}$, derived from a torque command $T_{em}{}^*$ by a dividing block 30, is applied to a circuit 32 having the transfer function $$s + \tau_{rl}{}^*,$$

where $$\tau_{rl}{}^* = \frac{R_r{}^*}{\sigma_a{}^* L_r{}^*} = \frac{1}{T_r{}^*},$$

and the resulting signal is divided in a divider 34 by the output signal of summer 28 to produce a rotor slip frequency command $\omega_a{}^{m*}$. Stator current command $i_{sq}{}^{a*}$ is also applied to a multiplier 36 wherein it is multiplied by rotor slip frequency command $\omega_a{}^{m*}$. The output signal of multiplier 36 is added in summer 22 to the aforementioned output signal of circuit 26 and to the output signal from PI compensator 18. PI compensator 18 is set to provide fast flux feedback so that when the open loop gain K* is tuned by slow PI compensator 20, then the output signal from PI compensator 18 is nulled. The output signal from summer 22 is applied to a circuit 40 having the transfer function $$\frac{1}{s + \tau_{rl}{}^*},$$

which provides the direct component of stator current $i_{sd}{}^a$.

The direct and quadrature components of stator current, $i_{sd}{}^a$ and $i_{sq}{}^a$, respectively, are provided to a vector rotator and two-to-three-phase transformation block 42 which transforms the coordinates of the stator current vector from an arbitrary synchronous reference frame (linked to an arbitrary flux vector) to a stationary reference frame, as described in U.S. Pat. No. 4,968,925, cited hereinabove. In particular, the output signals from vector rotator block 42 comprise three-phase drive signals for energizing the three phases of a current-regulated pulse-width modulated (CRPWM) inverter 44 to drive the three phases of induction motor 10 in well-known fashion.

For operation of the UFO controller of FIG. 1 in an indirect field-orientation mode (IUFO) mode, shaft position sensing means 46 is used to measure rotor position angle $\gamma_m{}^s$ and further to provide a frequency measurement $\omega_m{}^s$. An integrator 48 is provided to integrate the rotor slip frequency command $\omega_a{}^{m*}$, yielding a rotor slip angle command $\gamma_a{}^{m*}$. The rotor slip angle command $\gamma_a{}^{m*}$ is added in a summer 50 to the rotor position signal $\gamma_m{}^s$ from shaft position sensing means 46 to produce a signal representative of the angle $\gamma_a{}^s$.

The angle $\gamma_a{}^{s*}$ from summer 50, the slip frequency command $\omega_a{}^{s*}$ from dividing block 34, the output signals $\gamma_a{}^{s*}$ and $\omega_a{}^{s*}$ from CFO 12, and the frequency signal $\omega_m{}^s$ from shaft position sensing means 46 are applied to a DUFO/IUFO selection and transition block 52 for selecting operation in and enabling transitions between DUFO and IUFO modes. In both modes, flux amplitude feedback (squared or linear, as described hereinbelow) is used to tune the open loop gain K* and the slip frequency. At very low inverter frequencies (e.g., below about 3 MHz), the drive operates in the IUFO mode because, at such low frequencies, flux sensors are typically not able to provide flux feedback information above the signal noise levels. At slightly higher inverter frequencies (i.e., as soon as the angle of the flux vector can be calculated with relatively high precision), a transition is made to the DUFO mode. During the transition period, the flux feedback is used to tune the proportional gain K* such that a smooth transition (without sudden torque oscillations) can be realized by making the slip frequency substantially identical for both the IUFO and DUFO modes. The DUFO controller is not dependent on machine parameters in steady state when flux coils are used. On the other hand, if stator voltage and stator current sensors are used to calculate the stator flux position, then the DUFO controller depends only on the stator resistance for proper tuning. Hence, at higher frequencies, the preferred mode of operation is DUFO using stator flux control according to the present invention.

Figure 2:
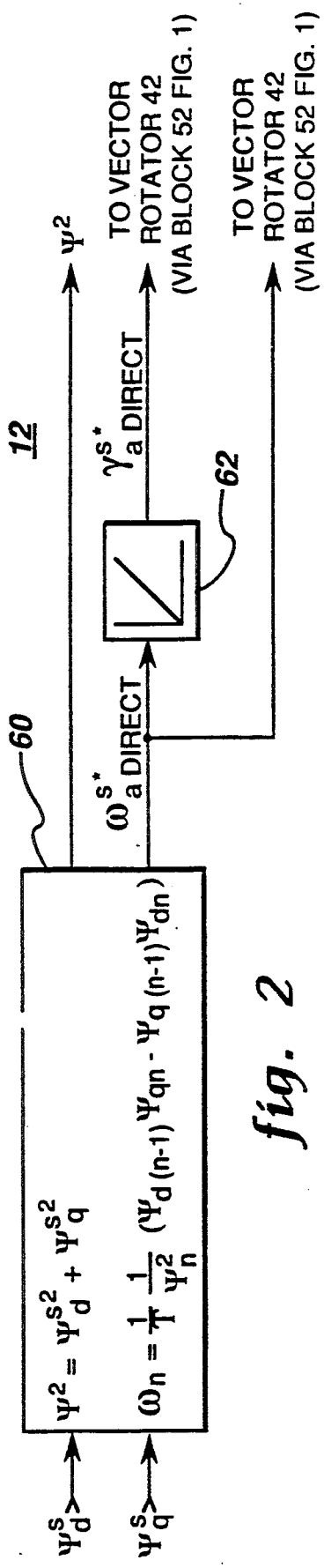
FIG. 2 is a block diagram illustrating a flux calculator for field orientation according to a first embodiment of the present invention.

FIG. 2 illustrates one preferred embodiment of a CFO 12 (FIG. 1) for determining flux amplitude $\Psi$ and angle $\gamma$ according to the present invention. Block 60 of CFO 12 provides flux amplitude squared feedback $\omega^2$ from the sensed direct and quadrature components of flux $\Psi_d{}^s$ and $\Psi_q{}^s$, respectively, according to the expression:

$$\Psi^2 = \Psi_d{}^{s2} + \Psi_q{}^{s2}.$$

By feeding back the amplitude of flux squared, the square root function described hereinabove is avoided, thereby saving time. Moreover, such nonlinear feedback has been found not to disturb the dynamics or steady-state performance of an induction motor drive.

To determine the flux angle $\gamma$ from the sensed dq components of flux, the actual frequency $\omega$ of the flux vector is determined. Actual frequency is given by the expression:

$$\omega = \frac{d\gamma}{dt} = \frac{d\left[\arctan\left(\frac{\Psi_q}{\Psi_d}\right)\right]}{dt}.$$

An analytical expression of this equation for $\omega$ may be represented as:

$$\omega = \frac{1}{\Psi^2}\left(\Psi_d \frac{d\Psi_q}{dt} - \Psi_q \frac{d\Psi_d}{dt}\right).$$

The analytical expression for $\omega$ can be digitally approximated by:

$$\omega_n = \frac{1}{T} \frac{1}{\Psi_n{}^2} (\Psi_{d(n-1)}\Psi_{qn} - \Psi_{q(n-1)}\Psi_{dn}),$$

where T represents the sampling interval. Advantageously, a time-consuming arc tangent function is avoided. Moreover, the term $\Psi_n{}^2$ is already available from flux amplitude squared feedback to determine the flux amplitude, as described hereinabove.

As shown in FIG. 2, an integrator 62 integrates the actual frequency $\omega$ to determine the flux angle $\gamma$. According to one preferred method of integration, flux angle $\gamma$ is determined from the Euler integration expression:

$$\gamma_n = \gamma_{n-1} + T\omega_n.$$

Such an integration step only requires, for example, two to four machine cycles, which is of little consequence in real-time implementation. Moreover, for applications that require frequency rather than flux angle, e.g., slip controllers or voltage-regulated PWM inverters, the integration step may even be avoided. To avoid drift on the integrator, it is necessary to reset the flux angle to zero in synchronism with the zero crossing of the q component of flux.

Figure 3:
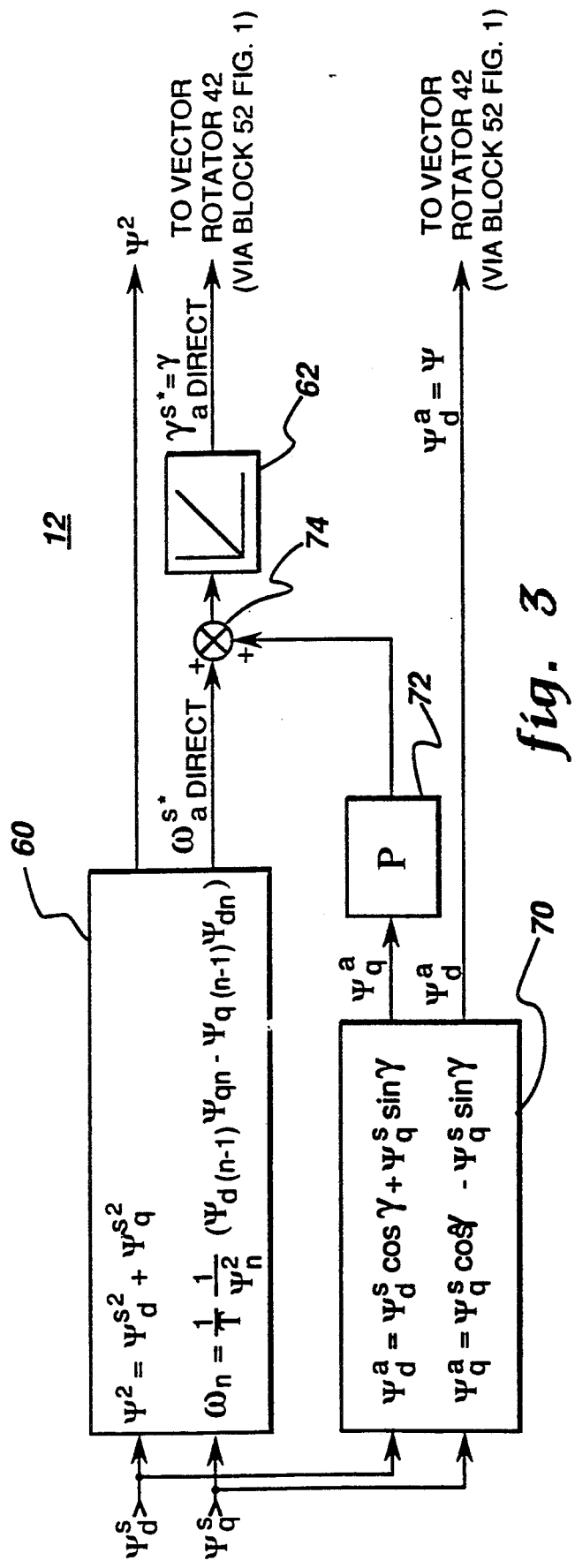
FIG. 3 is a block diagram illustrating a flux calculator for field orientation according to a second embodiment of the present invention.

Ideally, the q component of flux $\Psi_q^a$ is equal to zero because, by definition, the reference frame of the UFO controller is linked to the flux vector. Practically, however, the q component of flux $\Psi_q^a$ may be slightly different from zero due to quantization noise, signal noise and offsets. FIG. 3 illustrates an alternative embodiment of CFO 12 (FIG. 1) which provides a frequency correction loop to compensate for the detuning effects of noise and offsets.

As shown in FIG. 3, the sensed dq components of flux $\Psi_d^s$ and $\Psi_q^s$, respectively, are provided to a block 70 which determines the dq components of flux in an arbitrary UFO flux reference frame according to the expressions:

$$\Psi_d^a = \Psi_d^s \cos\gamma + \Psi_q^s \sin\gamma;$$

$$\Psi_q^a = \Psi_q^s \cos\gamma - \Psi_d^s \sin\gamma$$

Advantageously, the sine and cosine functions are already available from the vector rotator of the UFO controller. In particular, to maximize speed, the sine and cosine functions from the previous angle calculation step are used to correct the frequency. Alternatively, the frequency correction term $\Psi_q^a$ from the previous step may be used to correct the sine and cosine terms in the current calculation, if desired. In either case, as compared with a process of iterating until $\Psi_q^a$ equals zero, accuracy is sacrificed only slightly in favor of much higher speed.

In the embodiment of FIG. 3, the calculated d component of flux $\Psi_d^a$ is equal to the flux amplitude $\Psi$ which may thus be used for linear flux feedback instead of amplitude squared flux feedback, if desired. (If linear flux feedback is used, a linear flux amplitude signal $\Psi$ replaces the amplitude squared feedback signal $\Psi^{2*}$ in FIG. 1 and is compared with a linear flux command $\Psi^*$, as will be appreciated by those of skill in the art.) The calculated q component of flux $\Psi_q^a$ is provided to a proportional gain block 72, the gain of which is set such that an optimal response of the frequency correction loop (70, 72 and 74) is obtained without causing oscillations that may be induced by noise and calculation delays. A summer 74 adds the correction signal from proportional gain block 72 to the frequency $\omega$ from block 60, described hereinabove with reference to FIG. 2. The corrected frequency from summer 74 is then integrated by integrator 62, as described hereinabove, to provide the flux angle $\gamma$.

A highly reliable induction motor drive can be achieved using flux feedback in a UFO control scheme according to the present invention. For example, if the flux sensing means used for DUFO should fail, the drive can transition to the IUFO mode. On the other hand, if the shaft position sensing means used in IUFO should fail, the DUFO controller can maintain operation of the drive.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A flux feedback system for a field-oriented controller for an induction motor, comprising:

flux sensing means for sensing the direct and quadrature components $\Psi_d^s$ and $\Psi_q^s$, respectively, of flux in a stationary reference frame linked to a predetermined phase of the induction motor;

means for calculating the square of the flux amplitude $\Psi^2$ from the direct and quadrature components of flux according to:

$$\Psi^2 = \Psi_d^{s2} + \Psi_q^{s2};$$

digital means for approximating the actual frequency $\omega$ of flux according to:

$$\omega_n = \frac{1}{T} \cdot \frac{1}{\Psi^2} (\Psi_{d(n-1)}\Psi_{qn} - \Psi_{q(n-1)}\Psi_{dn}),$$

where T represents the sampling interval;

integrator means for integrating the actual frequency of flux to provide the flux angle $\gamma$;

feedback loop means having an open loop gain K*, said feedback loop means comparing the square of the flux amplitude $\Psi^2$ with an amplitude-squared flux command $\Psi^{2*}$ and providing a difference signal therefrom to tune said open loop gain K* and generate a tuned stator current signal for operation of the field-oriented controller at a commanded flux and a commanded slip frequency; and vector rotator means for receiving the flux angle $\gamma$ from said integrator means and the stator current signal from said feedback loop means and generating signals therefrom for driving the induction motor.

2. The flux feedback system of claim 1, further comprising mode selection means for enabling transitions between indirect and direct field orientation modes of operation based on the commanded slip frequency, the actual frequency of flux, and the flux angle.

3. The flux feedback system of claim 2 wherein said mode selection means enables operation in the indirect field orientation mode below a predetermined threshold frequency and enables operation in the direct field orientation mode above said threshold frequency.

4. The flux feedback system of claim 1 wherein the said flux sensing means comprises flux coils.

5. The flux feedback system of claim 1 wherein said flux sensing means comprises:

voltage sensing means for sensing the stator voltage $V_s$ across the respective stator phase winding; and flux estimating means for providing an estimate of the flux $\Psi$ according to:

$$\Psi = \int (V_s - I_s R_s) \, dt,$$

where $R_s$ is the resistance of the respective stator phase winding, and $I_s$ is the respective stator phase current.

6. A flux feedback system for a field-oriented controller for an induction machine, comprising:

flux sensing means for sensing the direct and quadrature components $\Psi_d{}^s$ and $\Psi_q{}^s$, respectively, of flux in a stationary reference frame linked to a predetermined phase of the induction motor;

means for calculating the square of the flux amplitude $\Psi^2$ from the direct and quadrature components of flux according to:

$$\Psi^2 = \Psi_d{}^{s2} + \Psi_q{}^{s2};$$

digital means for approximating the actual frequency $\omega$ of flux according to:

$$\omega_n = \frac{1}{T} \; \frac{1}{\Psi^2} \; (\Psi_{d(n-1)}\Psi_{qn} - \Psi_{q(n-1)}\Psi_{dn}),$$

where T represents the sampling interval;

means for calculating the direct and quadrature components of flux in an arbitrary flux reference frame, $\Psi_d{}^a$ and $\Psi_q{}^a$, respectively, according to:

$$\Psi_d{}^a = \Psi_d{}^s \cos\gamma + \Psi_q{}^s \sin\gamma$$

$$\Psi_q{}^a = \Psi_q{}^s \cos\gamma - \Psi_d{}^s \sin\gamma,$$

with $\Psi_d{}^a$ being substantially equal to flux amplitude;

multiplying means for multiplying the quadrature component of flux $\Psi_q{}^a$ by a predetermined proportional gain;

summing means for adding the quadrature component of flux, multiplied by the predetermined gain, to the actual frequency of the flux to provide a corrected frequency;

integrator means for integrating the corrected frequency to provide the flux angle $\gamma$;

feedback loop means having an open loop gain K*, said feedback loop means comparing the flux amplitude with a flux command and providing a difference signal therefrom to tune said open loop gain K* and generate a tuned stator current signal for operation of the field-oriented controller at a commanded flux and a commanded slip frequency; and vector rotator means for receiving the flux angle $\gamma$ from said integrator means and the stator current signal from said feedback loop means and generating signals therefrom for driving the induction motor.

7. The flux feedback system of claim 6, further comprising mode selection means for enabling transitions between indirect and direct field orientation modes of operation based on the commanded slip frequency, the corrected frequency, and the flux angle.

8. The flux feedback system of claim 7 wherein said mode selection means enables operation in the indirect field orientation mode below a predetermined threshold frequency and enables operation in the direct field orientation mode above said threshold frequency.

9. The flux feedback system of claim 6 wherein the said flux sensing means comprises flux coils.

10. The flux feedback system of claim 6 wherein said flux sensing means comprises:

voltage sensing means for sensing the stator voltage $V_s$ across the respective stator phase winding; and flux estimating means for providing an estimate of the flux $\Psi$ according to:

$$\Psi = \int (V_s - I_s R_s) \, dt,$$

where $R_s$ is the resistance of the respective stator phase winding, and $I_s$ is the respective stator phase current.

11. A flux feedback system for a field-oriented controller for an induction machine, comprising:

flux sensing means for sensing the direct and quadrature components $\Psi_d{}^s$ and $\Psi_q{}^s$, respectively, of flux in a stationary reference frame linked to a predetermined phase of the induction motor;

means for calculating the square of the flux amplitude $\Psi^2$ from the direct and quadrature components of flux according to:

$$\Psi^2 = \Psi_d{}^{s2} + \Psi_q{}^{s2};$$

digital means for approximating the actual frequency $\omega$ of flux according to:

$$\omega_n = \frac{1}{T} \; \frac{1}{\Psi^2} \; (\Psi_{d(n-1)}\Psi_{qn} - \Psi_{q(n-1)}\Psi_{dn}),$$

where T represents the sampling interval;

means for calculating the direct and quadrature components of flux in an arbitrary flux reference frame, $\Psi_d{}^a$ and $\Psi_q{}^a$, respectively, according to:

$$\Psi_d{}^a = \Psi_d{}^s \cos\gamma + \Psi_q{}^s \sin\gamma$$

$$\Psi_q{}^a = \Psi_q{}^s \cos\gamma - \Psi_d{}^s \sin\gamma,$$

with $\Psi_d{}^a$ being substantially equal to flux amplitude;

multiplying means for multiplying the quadrature component of flux $\Psi_q{}^a$ by a predetermined proportional gain;

summing means for adding the quadrature component of flux, multiplied by the predetermined gain, to the actual frequency of the flux to provide a corrected frequency;

integrator means for integrating the corrected frequency to provide the flux angle $\gamma$;

feedback loop means having an open loop gain K*, said feedback loop means comparing the square of the flux amplitude $\Psi^2$ with an amplitude-squared flux command $\Psi^{2*}$ and providing a difference signal therefrom to tune said open loop gain K* and generate a tuned stator current signal for operation of the universal field-oriented controller at a commanded flux and a commanded slip frequency; and vector rotator means for receiving the flux angle $\gamma$ from said integrator means and the stator current signal from said feedback loop means and generating signals therefrom for driving the induction motor.

12. The flux feedback system of claim 11, further comprising mode selection means for enabling transitions between indirect and direct field orientation modes of operation based on the commanded slip frequency, the corrected frequency, and the flux angle.

13. The flux feedback system of claim 12 wherein said mode selection means enables operation in the indirect field orientation mode below a predetermined threshold frequency and enables operation in the direct field orientation mode above said threshold frequency.

14. The flux feedback system of claim 11 wherein the said flux sensing means comprises flux coils.

15. The flux feedback system of claim 11 wherein said flux sensing means comprises:
voltage sensing means for sensing the stator voltage $V_s$ across the respective stator phase winding; and
flux estimating means for providing an estimate of the flux $\Psi$ according to:

$$\Psi = \int (V_s - I_s R_s) \, dt,$$

where $R_s$ is the resistance of the respective stator phase winding, and $I_s$ is the respective stator phase current.

16. In a flux feedback system for a field-oriented controller for an induction machine, a method for processing the amplitude and angle components of flux, comprising:
sensing the direct and quadrature components $\Psi_d^s$ and $\Psi_q^s$, respectively, of flux in a stationary reference frame linked to a predetermined phase of the induction motor;
calculating the square of the flux amplitude $\Psi^2$ from the direct and quadrature components of flux according to:

$$\Psi^2 = \Psi_d^{s2} + \Psi_q^{s2};$$

digitally approximating the actual frequency $\omega$ of flux according to:

$$\omega_n = \frac{1}{T} \frac{1}{\Psi^2} (\Psi_{d(n-1)} \Psi_{qn} - \Psi_{q(n-1)} \Psi_{dn}),$$

where T represents the sampling interval;
integrating the actual frequency of flux to provide the flux angle $\gamma$;
feeding back the square of the flux amplitude $\Psi^2$ and comparing the square of the flux amplitude $\Psi^2$ with an amplitude-squared flux command $\Psi^{2*}$ and providing a difference signal therefrom to tune an open loop gain K* and generate a tuned stator current signal for operation of the field-oriented controller at a commanded flux and a commanded slip frequency; and
generating drive signals from the flux angle $\gamma$ and the stator current signal for driving the induction motor.

17. The method of claim 16, further comprising the step of selecting between indirect and direct field orientation modes of operation based on the commanded slip frequency, the actual frequency of flux, and the flux angle.

18. The method of claim 16 wherein the selecting step comprises enabling operation in the indirect field orientation mode below a predetermined threshold frequency and enabling operation in the direct field orientation mode above said threshold frequency.

19. The method of claim 16 wherein the step of sensing the direct and quadrature components $\Psi_d^s$ and $\Psi_q^s$, respectively, of flux comprises using flux coils.

20. The method of claim 16 wherein the step of sensing the direct and quadrature components $\Psi_d^s$ and $\Psi_q^s$, respectively, of flux comprises:
sensing the stator voltage $V_s$ across the respective stator phase winding; and
providing an estimate of the flux $\Psi$ according to:

$$\Psi = \int (V_s - I_s R_s) \, dt,$$

where $R_s$ is the resistance of the respective stator phase winding, and $I_s$ is the respective stator phase current.

21. The method of claim 16 wherein the integrating step comprises integration of the actual frequency $\omega$ according to:

$$\gamma_n = \gamma_{n-1} + T\omega_n$$

22. In a flux feedback system for a field-oriented controller for an induction machine, a method for processing the amplitude and angle components of flux, comprising:
sensing the direct and quadrature components $\Psi_d^s$ and $\Psi_q^s$, respectively, of flux in a stationary reference frame linked to a predetermined phase of the induction motor;
calculating the square of the flux amplitude $\Psi^2$ from the direct and quadrature components of flux according to:

$$\Psi^2 = \Psi_d^{s2} + \Psi_q^{s2};$$

digitally approximating the actual frequency $\omega$ of flux according to:

$$\omega_n = \frac{1}{T} \frac{1}{\Psi^2} (\Psi_{d(n-1)} \Psi_{qn} - \Psi_{q(n-1)} \Psi_{dn}),$$

where T represents the sampling interval;
calculating the direct and quadrature components of flux in an arbitrary flux reference frame according to:

$$\Psi_d^a = \Psi_d^s \cos\left\{\vphantom{\int}\right. + \Psi_q^s \sin\left\{\vphantom{\int}\right.$$
$$\Psi_q^a = \Psi_q^s \cos\left\{\vphantom{\int}\right. - \Psi_d^s \sin\left\{\vphantom{\int}\right.,$$

with $\Psi_d^a$ being substantially equal to flux amplitude;
multiplying the quadrature component of flux $\Psi_q^a$ by a predetermined proportional gain;
adding the quadrature component of flux, multiplied by the predetermined gain, to the actual frequency of the flux to provide a corrected frequency;
integrating the corrected frequency to provide the flux angle;
feeding back the flux amplitude and comparing the flux amplitude with a flux command and providing a difference signal therefrom to tune an open loop gain K* and generate a tuned stator current signal for operation of the field-oriented controller at a commanded flux and a commanded slip frequency; and
generating drive signals from the flux angle $\gamma$ and the stator current signal for driving the induction motor.

23. The method of claim 22, further comprising the step of selecting between indirect and direct field orientation modes of operation based on the commanded slip frequency, the corrected frequency, and the flux angle.

24. The method of claim 23 wherein the selecting step comprises enabling operation in the indirect field orientation mode below a predetermined threshold frequency and enabling operation in the direct field orientation mode above said threshold frequency.

25. The method of claim 22 wherein the step of sensing the direct and quadrature components $\Psi_d{}^s$ and $\Psi_q{}^s$, respectively, of flux comprises using flux coils.

26. The method of claim 22 wherein the step of sensing the direct and quadrature components $\Psi_d{}^s$ and $\Psi_q{}^s$, respectively, of flux comprises:
sensing the stator voltage $V_s$ across the respective stator phase winding; and
providing an estimate of the flux $\Psi$ according to:

$$\Psi = \int (V_s - I_s R_s)\, dt,$$

where $R_s$ is the resistance of the respective stator phase winding, and $I_s$ is the respective stator phase current.

27. The method of claim 22 wherein the integrating step comprises integration of the actual frequency $\omega$ according to:

$$\gamma_n = \gamma_{n-1} + T\omega_n.$$

28. In a flux feedback system for a field-oriented controller for an induction machine, a method for processing the amplitude and angle components of flux, comprising:
sensing the direct and quadrature components $\Psi_d{}^s$ and $\Psi_q{}^s$, respectively, of flux in a stationary reference frame linked to a predetermined phase of the induction motor;
calculating the square of the flux amplitude $\Psi^2$ from the direct and quadrature components of flux according to:

$$\Psi^2 = \Psi_d{}^{s2} + \Psi_q{}^{s2};$$

digitally approximating the actual frequency $\omega$ of flux according to:

$$\omega_n = \frac{1}{T} \frac{1}{\Psi^2} (\Psi_{d(n-1)} \Psi_{qn} - \Psi_{q(n-1)} \Psi_{dn}),$$

where T represents the sampling interval;
calculating the direct and quadrature components of flux in an arbitrary flux reference frame according to:

$$\Psi_d{}^a = \Psi_d{}^s \cos\gamma + \Psi_q{}^s \sin\gamma$$

$$\Psi_q{}^a = \Psi_q{}^s \cos\gamma - \Psi_d{}^s \sin\gamma,$$

with $\Psi_d{}^a$ being substantially equal to flux amplitude;
multiplying the quadrature component of flux $\Psi_q{}^a$ by a predetermined proportional gain;
adding the quadrature component of flux, multiplied by the predetermined gain, to the actual frequency of the flux to provide a corrected frequency;
integrating the corrected frequency to provide the flux angle $\gamma$;
feeding back the square of the flux amplitude $\Psi^2$ and comparing the square of the flux amplitude $\Psi^2$ with an amplitude-squared flux command $\Psi^{2*}$ and providing a difference signal therefrom to tune an open loop gain $K^*$ and generate a tuned stator current signal for operation of the field-oriented controller at a commanded flux and a commanded slip frequency; and
generating drive signals from the flux angle $\gamma$ and the stator current signal for driving the induction motor.

29. The method of claim 28, further comprising the step of selecting between indirect and direct field orientation modes of operation based on the commanded slip frequency, the corrected frequency, and the flux angle.

30. The method of claim 29 wherein the selecting step comprises enabling operation in the indirect field orientation mode below a predetermined threshold frequency and enabling operation in the direct field orientation mode above said threshold frequency.

31. The method of claim 28 wherein the step of sensing the direct and quadrature components $\Psi_d{}^s$ and $\Psi_q{}^s$, respectively, of flux comprises using flux coils.

32. The method of claim 28 wherein the step of sensing the direct and quadrature components $\Psi_d{}^s$ and $\Psi_q{}^s$, respectively, of flux comprises:
sensing the stator voltage $V_s$ across the respective stator phase winding; and
providing an estimate of the flux $\Psi$ according to:

$$\Psi = \int (V_s - I_s R_s)\, dt,$$

where $R_s$ is the resistance of the respective stator phase winding, and $I_s$ is the respective stator phase current.

33. The method of claim 28 wherein the integrating step comprises integration of the actual frequency $\omega$ according to:

$$\gamma_n = \gamma_{n-1} + T\omega_n.$$

* * * * *